July 17, 1928.  L. WERTHEIMER  1,677,221
COFFEE URN
Filed Aug. 13, 1924   2 Sheets-Sheet 1
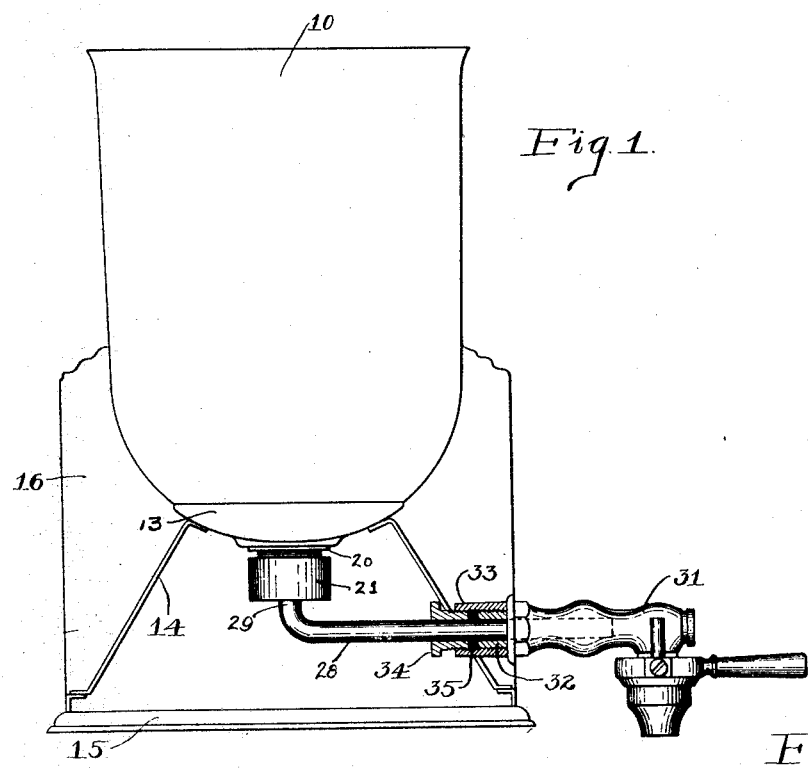
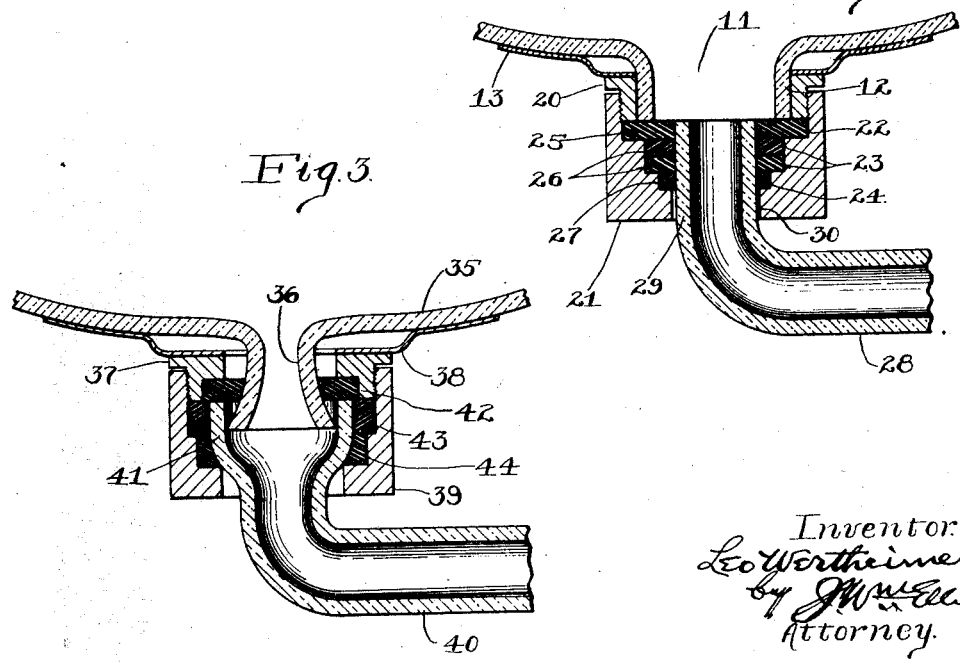
Inventor
Leo Wertheimer
by J. W. Ellis
Attorney

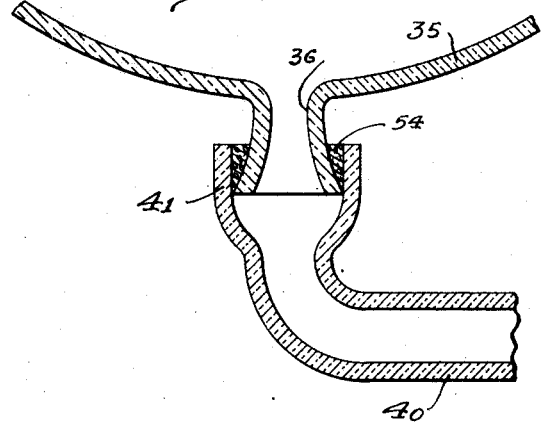
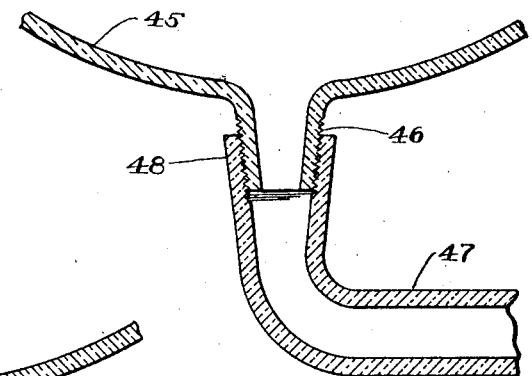
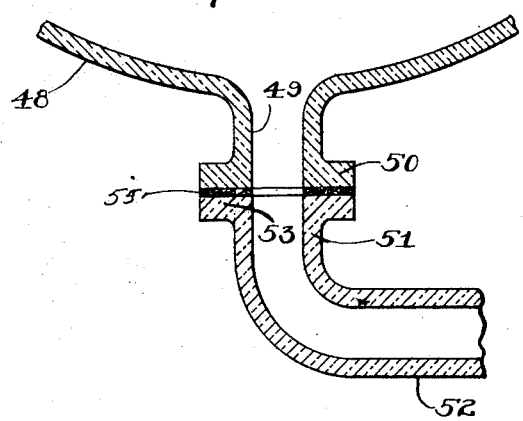

Patented July 17, 1928.

1,677,221

UNITED STATES PATENT OFFICE.

LEO WERTHEIMER, OF BUFFALO, NEW YORK, ASSIGNOR, BY MESNE ASSIGNMENTS, TO AMCOIN COFFEE SYSTEM COMPANY, INC., OF BUFFALO, NEW YORK, A CORPORATION OF NEW YORK.

COFFEE URN.

Application filed August 13, 1924. Serial No. 731,764.

It is well known to those skilled in the art that in coffee urns it is very difficult and well nigh impossible to prevent or even remove the accumulation of caffeine and tannic acid in the urns of the present day art. There are so many corners and crevasses for the accumulation of this poison, that in order to properly and thoroughly clean a coffee urn, it is almost essential that the same be disassembled.

The principal object of my invention has been to produce a coffee urn which shall be provided with a glass lining and glass dispensing channel. It is well known that caffeine and tannic acid do not adhere to glass as readily as they do to metal, and, therefore, there is not the frequent necessity of cleaning a glass lined urn. Whenever a cleansing is necessary, it is very easy of accomplishment in my device.

Another object has been to provide a coffee urn which shall be very durable in construction, and one easily disassembled so that broken parts may be replaced.

Furthermore, my device is inexpensive to manufacture.

The above objects and advantages have been accomplished by the device shown in the accompanying drawings, of which:

Fig. 1 is a sectional elevation of my coffee urn.

Fig. 2 is an enlarged, fragmentary, sectional view of the connection of the outlet pipe with the liner of the urn.

Figs. 3, 4, 5, and 6 are slightly enlarged fragmentary views of modified forms of connections between the outlet pipe and the liner of the urn.

Referring to the form of invention shown in Figs. 1 and 2, 10 represents the liner of the urn, which is of glass and provided at its bottom with an outlet opening 11, provided with a neck 12, formed on the liner.

The liner is supported upon a copper plate 13, which is held in position by means of a plurality of braces 14 which have their upper ends suitably secured to the plate and their lower ends suitably secured to the base 15 of the urn. The urn is provided with an outer casing 16 as is customary, and the space between the casing and the urn may be used to preheat the water used in the urn as is customary.

20 is a flange which fits over the neck 12 of the liner 10. This flange is soldered or otherwise fastened to the proper plate 13 and is also provided with a central opening to accommodate the neck 12 of the liner. The flange 20 is provided with exterior screw threads and the bottom edge of the flange preferably extends to the bottom edge of the neck 12 of the liner. A coupling 21 is disposed under the liner, and is provided with interior screw threads for engagement with the threads formed on the flange 20. This coupling is provided with recesses 22, 23, and 24, in each of which is placed a washer 25, 26, and 27 respectively. The washer 25 is of such a size that it will bear against the lower end of the neck 12 and the downwardly extending portion of the flange 20 whereby the joint at this point of the urn will be efficiently packed. The washers 26 and 27 are for the purpose of packing the outlet pipe 28. The outlet pipe is provided with an upwardly extending portion 29, which passes through an opening 30 in the coupling, and about which the washers 26 and 27 are disposed. These washers, of course, are preferably fitted snugly within the recesses and about the end 29 of the outlet pipe. It will be clear that when the coupling is screwed up into place all of the washers will be compressed and thereby effectively pack the joint between the glass liner and the outlet pipe. It will also be obvious that no metal is exposed and that the passage from the liner to the pipe is glass and without obstructions.

The outlet pipe 28 is also made of glass and extends outwardly through the casing 16. In the drawings, I have shown a standard form of urn faucet 31, and the shank of this faucet is bored out up to substantially the point of outlet to fit the glass outlet pipe, so that the passage for the coffee is glass lined substantially up to the point of discharge. The shank of the faucet is provided with a screw threaded portion 32 as is customary and a packing nut 33 is screw-threaded over the screw-threaded portion 32 of the shank so as to firmly hold the faucet in position on the urn. The packing nut is longer than the screw-threaded portion 32 and extends outwardly beyond the end thereof, whereby a stuffing box is provided into which a packing gland 34 is screw-threaded. A suitable packing 35 is provided, whereby leakage will be prevented at this point.

In Fig. 3, I show a modified form of liner 35, which is provided with a neck 36 which flares outwardly at its lower end. In this form a flange 37 is provided which is preferably soldered to the copper plate 38 and to this flange is secured a coupling 39. The outlet pipe 40 is provided with an upwardly extending and outwardly flaring end 41 which is of a size so that it will fit over the flaring neck 36 of the liner. By this arrangement, the coffee passageway is entirely glass lined. A gasket 42 is fitted around the neck 36 of the liner and preferably fits into a recess formed in the flange 38. The end 41 of the outlet pipe bears against the gasket 42, and two gaskets 43 and 44 are disposed about the end of the outlet pipe and arranged in suitable recesses formed in the coupling 39. It is obvious that all the gaskets will be tightened when the coupling is drawn up over the threads of the flange 37.

The form of invention shown in Fig. 4 is the same as that shown in Fig. 3, except that the parts are held together by a suitable cement, shown at 54.

The modification of Fig. 5 shows a liner 45 having a neck 46 formed with exterior screw threads. The outlet pipe 47 of this form of invention is provided with a flaring upper end 48 formed with interior screw threads for engagement with the screw threads of the neck 46. A suitable cement may be employed when assembling these parts.

In the modification of Fig. 6, the glass liner 48 is provided with a neck 49 having a flange 50 at its lower end. The upwardly extending portion 51 of the outlet pipe 52 is provided with a flange 53 for engagement with the flange 50. The flanges 50 and 53 may be held together by suitable cement, shown at 55.

In the modified forms of my invention, I have omitted to show the packing of the outlet pipe where it passes through the outer casing of the device, but it is obvious that each of the forms will be as complete as the form shown in Fig. 1.

Obviously some other modifications of the forms herein shown and described may be made without departing from the spirit of my invention, or the scope of the appended claims, and I do not, therefore, wish to be limited to the exact embodiments herein shown and described, the forms herein embodied being merely preferred forms thereof.

Having thus described my invention, what I claim is:

1. A coffee urn comprising a glass liner having a downwardly extending neck, a supporting plate arranged below the liner, a coupling flange arranged about the neck and secured to the plate, a coupling engageable with the flange, a glass outlet pipe having an upwardly extending end engaging with the coupling, and gaskets carried by the coupling for sealing the neck of the liner and the outlet pipe.

2. A coffee urn comprising a glass liner having an integral downwardly extending neck, a supporting member beneath said liner, a coupling fixed to said member and extending down about said neck, a glass outlet pipe extending up into said coupling, packing members within said coupling for sealing the neck of the liner and the outlet pipe and a faucet at the outer end of said pipe.

3. A coffee urn comprising an outer casing, a supporting member within said casing, a collar carried by said supporting member, an outlet pipe having its inner end fixed in the lower portion of said collar, a faucet at the outer end of said pipe and a liner removably supported on said supporting member and having an integral neck extending down into said collar.

4. A coffee urn comprising an outer casing, a supporting member within said casing, a collar carried by said supporting member, a glass outlet pipe having its inner end fixed in the lower portion of said collar, a faucet at the outer end of said pipe and a glass liner removably supported on said supporting member and having an integral neck extending down into said collar.

In testimony whereof, I have hereunto siged my name.

LEO WERTHEIMER.